(12) United States Patent
Motoe et al.

(10) Patent No.: US 7,852,320 B2
(45) Date of Patent: Dec. 14, 2010

(54) INFORMATION PROCESSING APPARATUS

(75) Inventors: Hironori Motoe, Ome (JP); Takashi Iwai, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 175 days.

(21) Appl. No.: 12/340,008

(22) Filed: Dec. 19, 2008

(65) Prior Publication Data

US 2009/0167683 A1    Jul. 2, 2009

(30) Foreign Application Priority Data

Dec. 27, 2007 (JP) ............................. 2007-338251

(51) Int. Cl.
*G09G 5/08* (2006.01)
(52) U.S. Cl. .................. 345/158; 345/165; 345/166; 345/168; 463/37
(58) Field of Classification Search ......... 345/158–169; 348/734; 463/37–38; 250/221
See application file for complete search history.

(56) References Cited

U.S. PATENT DOCUMENTS 6,057,540 A * 5/2000 Gordon et al. .............. 250/221
7,239,304 B2 * 7/2007 Hoshino et al. ............. 345/175
2003/0034959 A1 * 2/2003 Davis et al. ................. 345/166
2006/0066572 A1 3/2006 Yumoto et al.
2008/0231596 A1 * 9/2008 Liu et al. .................... 345/158

FOREIGN PATENT DOCUMENTS

JP    2007-25801 A    2/2007

* cited by examiner

*Primary Examiner*—Lun-Yi Lao
(74) *Attorney, Agent, or Firm*—Knobbe, Martens Olson & Bear LLP

(57) ABSTRACT

According to one embodiment, an optical position detection IC outputs, in accordance with movement of an object on a detection area including a light-transmissive area which is disposed on a top surface of a housing. A control module controls a movement direction and a movement amount of a cursor, which is displayed on a display screen of a display device, based on an attitude signal which indicates in which of two directions the optical position detection IC is disposed, and movement amount information which is output from the optical position detection IC.

6 Claims, 7 Drawing Sheets

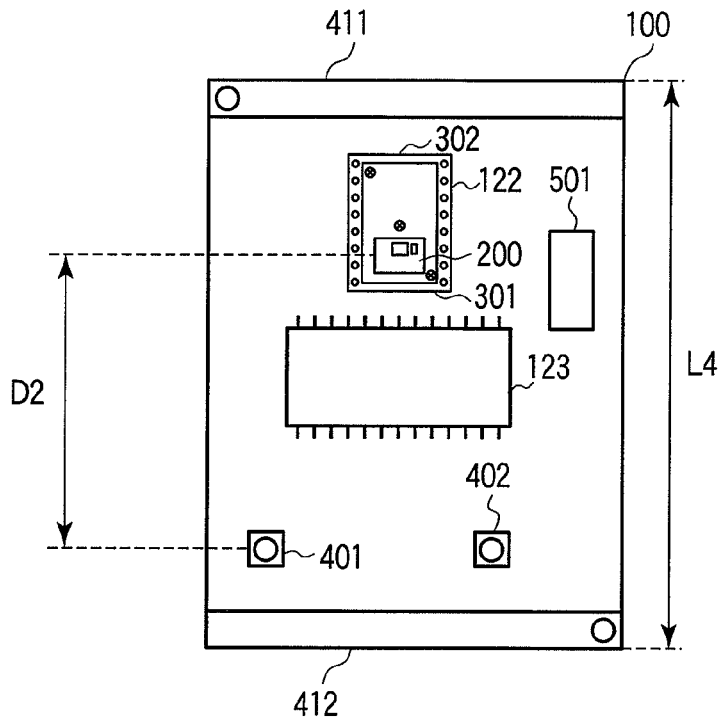
F I G. 10
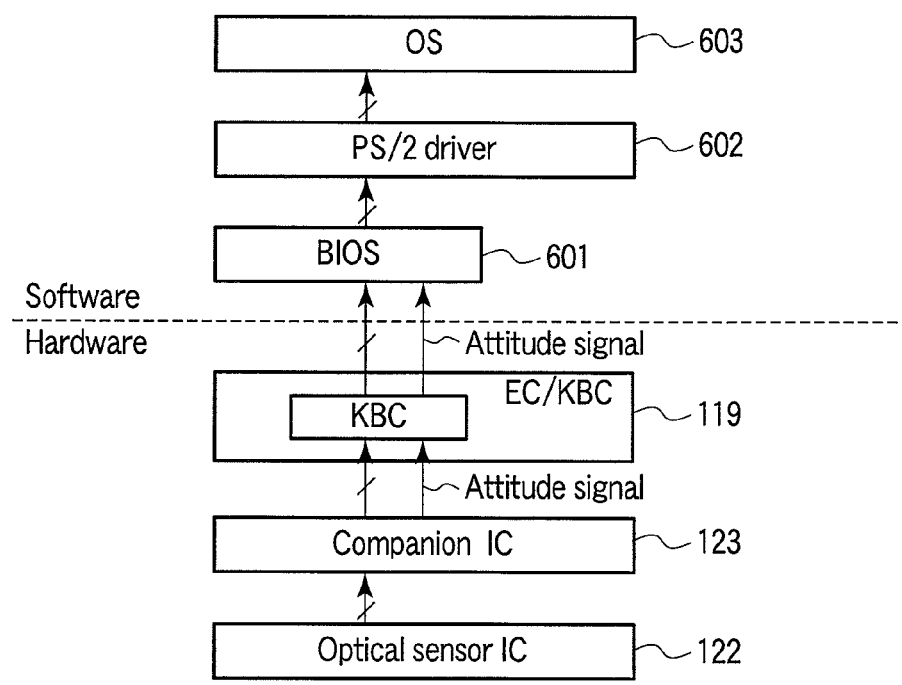
F I G. 11

INFORMATION PROCESSING APPARATUS

CROSS-REFERENCE TO RELATED APPLICATIONS

This application is based upon and claims the benefit of priority from Japanese Patent Application No. 2007-338251, filed Dec. 27, 2007, the entire contents of which are incorporated herein by reference.

BACKGROUND

1. Field

One embodiment of the invention relates to an information processing apparatus, such as a personal computer, which includes a sensor functioning as a pointing device.

2. Description of the Related Art

In general, in an information processing apparatus such as a personal computer, a mouse or a touch pad is used as a pointing device. A user can perform a pointing operation, such as an operation of moving the position of a cursor on a display screen, by moving the mouse, for example, on the desk, or by moving the finger over the touch pad.

Jpn. Pat. Appln. KOKAI Publication No. 2007-25801 discloses an apparatus which controls the mouse in two operation modes. In this apparatus, use is made of a normal mode in which the mouse is used in a predetermined direction, and a turned-over mode in which the mouse is used in a direction in which the mouse is turned over, relative to the predetermined direction. In the turned-over mode, the direction of movement of the cursor is automatically turned over. Thereby, the user can use the mouse not only in the predetermined direction, but also in the turned-over direction.

However, in the case where the mouse is used as a pointing device, it is necessary to move the mouse over a surface such as the surface of the desk. Thus, the place of use of the computer is limited to a specific place, for example, within a home or within an office. Besides, in the case of the touch pad, it is necessary to dispose, on the housing of the computer, a coordinate detection area with such a size that a touched position can be detected.

Under the circumstances, there has recently been a demand for the development of a novel pointing device which can execute a pointing operation with a small space being occupied.

In addition, in the case where a device, such as a sensor IC, for realizing a pointing device is built in the housing of a computer, it is necessary to determine the position where the sensor IC is to be mounted, by taking into account the efficiency of mounting of various components and the operability of the pointing device. In usual cases, the sensor IC has to be disposed in a certain fixed direction. The reason is that the direction of movement of the finger and the direction of movement of the cursor need to be matched so that when the finger moves rightward, for example, the cursor may also move rightward.

However, such a restriction to the direction of disposition of the sensor IC becomes a factor that causes a decrease in efficiency of mounting.

Therefore, a novel technique is needed for increasing the degree of freedom of the direction in which the sensor IC is disposed. In this case, if no restriction is imposed on the direction in which the sensor IC can be positioned, it would be necessary to construct a system so as to cover, for example, all the four directions in which the sensor IC can be positioned. This will possibly make the system configuration very complex.

It is necessary, therefore, to realize a novel technique which can increase the degree of freedom of the direction in which a device, such as a sensor IC, is disposed, without making the system configuration complex.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 10 is an exemplary view showing the state in which the optical position detection IC, which is used in the computer shown in FIG. 8, is mounted on the printed circuit board in a direction opposite to the first direction;

FIG. 11 shows a structure example of hardware and software, which is applied to the computer according to the embodiment.

DETAILED DESCRIPTION

Various embodiments according to the invention will be described hereinafter with reference to the accompanying drawings. In general, according to one embodiment of the invention, an information processing apparatus including: a rectangular housing with a right end portion, a left end portion, a front end portion and a rear end portion; an optical position detection IC configured to output, in accordance with movement of an object on a detection area including a light-transmissive area which is disposed on a top surface of the housing, two-dimensional movement amount information which is indicative of movement amounts of the object in a horizontal direction and a vertical direction, the optical position detection IC including a rectangular package with one end portion and the other end portion, and a sensor module which detects the movement of the object, the sensor module being provided at a position in the package, which is biased more on the one end portion side than a central position of the package; an attitude signal output module provided in the housing, configured to output a 1-bit-width attitude signal which indicates whether the optical position detection IC is disposed in a first direction in which the one end portion of the package is opposed to the right end portion of the housing and the other end portion of the package is opposed to the left end portion of the housing, or in a second direction in which the one end portion of the package is opposed to the rear end portion of the housing and the other end portion of the package is opposed to the front end portion of the housing; and a control module provided in the housing, configured to control a movement direction and a movement amount of a cursor, which is displayed on a display screen of a display device, based on the attitude signal and the movement amount information.

To begin with, the structure of an information processing apparatus according to an embodiment of the present invention is described with reference to FIG. 1. This information processing apparatus is realized, for example, as a battery-powerable portable computer.

Figure 1:
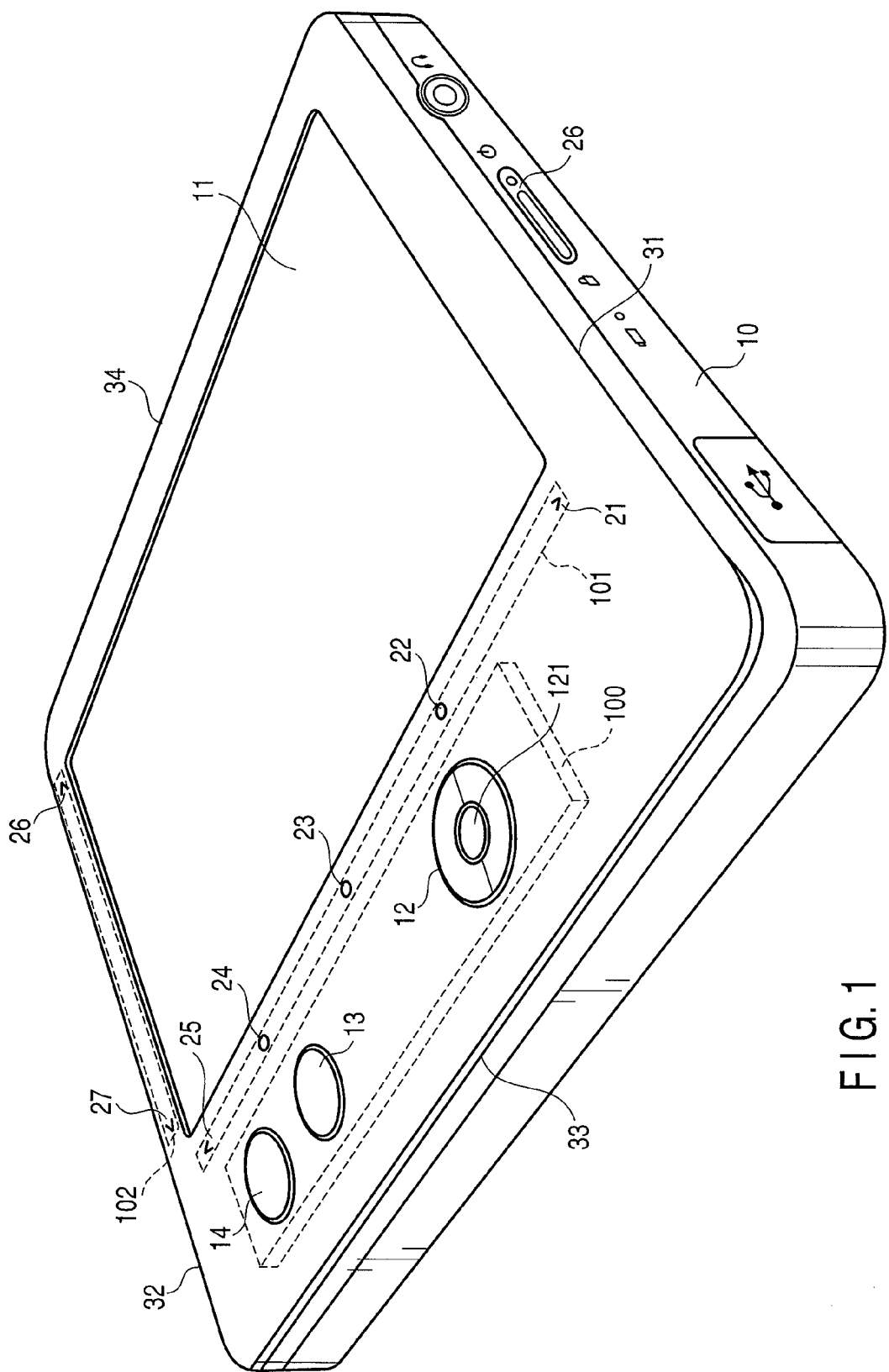
FIG. 1 is an exemplary perspective view showing an external appearance of a computer according to an embodiment of the invention.

FIG. 1 is a perspective view of the computer. This computer is a so-called palmtop computer having such a size that the computer is placed on the palm of a user. The computer has a thin box-shaped housing 10. The housing 10 has a rectangular shape with a right end portion 31, a left end portion 32, a front end portion 33 and a rear end portion 34. Various electronic components, which constitute the computer, are built in the housing 10. A display device 11, which is composed of, e.g. an LCD (Liquid Crystal Display), is disposed on a top surface of the housing 10 in such a manner that the display screen of the display device 11 is exposed. The display device 11 may be realized by a touch screen device which can detect a touched position.

An optical pointing device 12 and button switches 13 and 14 are disposed on the top surface of the housing 10. The optical pointing device 12 is a device for optically detecting movement of an object such as the finger. The optical pointing device 12 is composed of a detection area 121 (also referred to as "sensing area") including a light-transmissive area, and an optical position detection IC which is built in the housing 10. The detection area 121 is disposed on the top surface of the housing 10. The detection area 121 is a substantially transparent, circular light-transmissive area which is disposed at a central position of a circular plastic cover surface. The entirety of the circular plastic cover surface including the detection area 121 is used as an operation area for the movement of the user's finger.

If the user moves the finger in the upward, downward, leftward or rightward direction in the state in which the finger is placed on the detection area 121, the movement of a pattern, such as a fingerprint, is detected by the optical pointing device 12. The optical position detection IC radiates light to the detection area 121, and detects the movement of the object by using reflective light from the object such as the finger. The optical position detection IC can be realized by an image sensor.

The button switches 13 and 14 input events which instruct execution of functions that are assigned to the button switches 13 and 14. For example, the button switches 13 and 14 function as a left button and a right button of a mouse, respectively. Each of the button switches 13 and 14 is composed of a circular button switch operation portion which is disposed on the top surface of the housing 10, and a switch detection circuit which is built in the housing 10.

The optical position detection IC of the optical pointing device 12 and two switch detection circuits corresponding to the button switches 13 and 14 are mounted on a printed circuit board 100 which is built in the housing 10.

An electrostatic sensor area 101, which extends along a lower side of the display screen of the display device 11, and an electrostatic sensor area 102, which extends along a left side of the display screen of the display device 11, are disposed on the top surface of the housing 10.

For example, five sensor button areas 21, 22, 23, 24 and 25 are included in the electrostatic sensor area 101. Arbitrary functions can be assigned to the sensor button areas 21, 22, 23, 24 and 25. Electrostatic sensors, which sense the presence/absence of touch operations on the sensor button areas 21, 22, 23, 24 and 25, are built in the housing 10.

For example, two sensor button areas 26 and 27 are included in the electrostatic sensor area 102. Arbitrary functions can be assigned to the sensor button areas 26 and 27. Electrostatic sensors, which sense the presence/absence of touch operations on the sensor button areas 26 and 27, are built in the housing 10.

In addition, a power button 26, etc. are provided on the right side surface of the housing 10.

Figure 2:
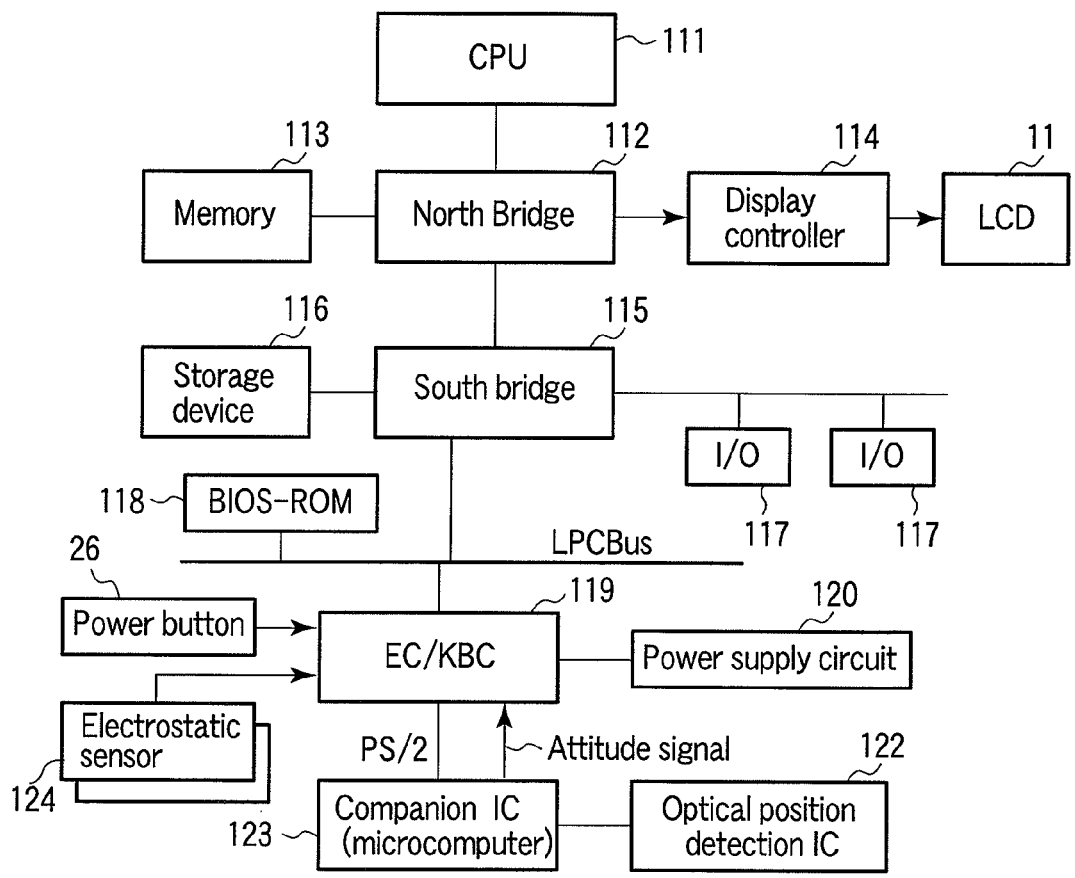
FIG. 2 is an exemplary block diagram showing an example of the system configuration of the computer according to the embodiment.

Next, referring to FIG. 2, the system configuration of the computer according to this embodiment is described.

The computer includes a CPU 111, a north bridge 112, a memory 113, a display controller 114, a south bridge 115, a storage device 116 which is composed of a hard disk drive or a nonvolatile semiconductor memory, various I/O devices 117, a BIOS-ROM 118, an embedded controller/keyboard controller IC (EC/KBC) 119, a power supply circuit 120, an optical position detection IC (optical sensor IC) 122, a companion IC 123, and an electrostatic sensor IC 124.

The CPU 111 is a processor which is provided in order to control the operation of the computer. The CPU 111 executes an operating system and various application programs, which are loaded from the storage device 116 into the memory 113. In addition, the CPU 111 executes a BIOS (Basic Input/Output System) that is stored in the BIOS-ROM 118. The BIOS is a program for hardware control, and executes a movement direction adjusting process which varies the direction of movement of a cursor in accordance with the direction in which the optical position detection IC 122 is disposed, thereby to match the direction in which the optical position detection IC 122 is disposed and the direction of movement of the cursor that is displayed on the display screen. The BIOS is executed by the CPU 111 and, in this sense, the CPU 111 functions as a control module for executing the movement direction adjusting process.

The north bridge 112 is a bridge device which connects a local bus of the CPU 111 and the south bridge 115. The north bridge 112 includes a memory controller which access-controls the memory 113. The north bridge 112 also has a function of executing communication with the display controller 114 via, e.g. a PCI EXPRESS serial bus.

The display controller 114 is a display controller which controls the display device 11, such as an LCD, which is used as a display monitor of the computer. The south bridge 115 includes an interface controller for controlling the storage device 116. In addition, the south bridge 115 executes communication with devices on an LPC (low pin count) bus.

The embedded controller/keyboard controller IC (EC/KBC) 119 is a 1-chip microcomputer in which an embedded controller (EC) for power management and a keyboard controller (KBC) for controlling a keyboard and a pointing device are integrated. The EC/KBC 119 has a function of powering on/off the computer in accordance with a user's operation of the power button 26. The power-on/off control of the computer is executed by the cooperation between the EC/KBC 119 and the power supply circuit 120. In addition, the EC/KBC 119 has a function of executing communication with the optical position detection IC 122 via the companion IC 123, and a function of executing communication with the electrostatic sensor IC 124.

The optical position detection IC 122 detects the movement of an object, such as the movement of the finger, on the detection area 121 including the light-transmissive area. That is, the optical position detection IC 122 detects the movement of a pattern of an object, such as a fingerprint. The optical position detection IC 122 outputs two-dimensional movement amount information which is indicative of movement amounts in a horizontal direction (X) and a vertical direction (Y) of the detected pattern of the object. The optical position detection IC 122 includes a sensor unit which senses the movement of the pattern. The sensor unit includes a light source (light-emitting element) which radiates light (illumination light) to the detection area 121, and an image sensor unit which receives reflective light from the object and detects the movement of the pattern of the object. The image sensor unit detects the movement of the pattern of the object on the detection area 121, and outputs two-dimensional movement amount information which is indicative of movement amounts in a horizontal direction and a vertical direction of the pattern. The two-dimensional movement amount information is sent from the optical position detection IC 122 to the companion IC 123.

The companion IC 123 is an IC for executing interface with the EC/KBC 119. The companion IC 123 is realized, for example, by a 1-chip microcomputer. The companion IC 123 converts the movement amount information, which is received from the optical position detection IC 122, to a predetermined movement amount signal having a signal format such as a PS/2 interface format, and sends the movement amount signal to the EC/KBC 119.

In addition, the companion IC 123 includes an attitude signal output unit for outputting an attitude signal which is indicative of the direction in which the optical position detection IC 122 is disposed. This attitude signal is a 1-bit width signal which is indicative of whether the optical position detection IC 122 is disposed in a first direction or a second direction. The details of the first direction and second direction, which are used in this embodiment, will be described below with reference to FIG. 5 and the following Figures.

Figure 3:
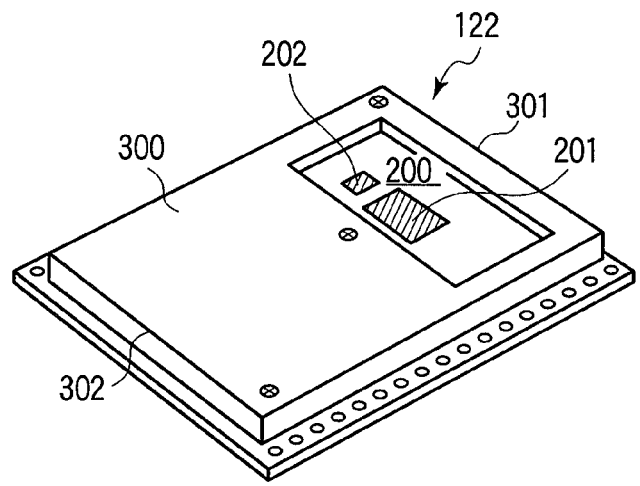
FIG. 3 is an exemplary perspective view showing the structure of an optical position detection IC, which is used in the computer according to the embodiment.

FIG. 3 is a perspective view showing an example of the external appearance of the optical position detection IC 122.

The optical position detection IC 122 has a rectangular package 300 having one end portion 301 and the other end portion 302. A sensor unit 200 is disposed not at a central portion of the package 300, but at a position which is biased more on the one end portion 301 side than the central position. The sensor unit 200 is a sensor module which detects the movement of the pattern of the object, such as the user's fingerprint. In this embodiment, the sensor unit 200 includes an image sensor 201 and an LED 202. Needless to say, the LED 202 is not necessarily provided within the optical position detection IC 122. For example, the LED 202 may be realized by a device which is separate from the optical position detection IC 122, and this device may be provided within the housing 10 in the vicinity of the optical position detection IC 123.

The LED 202 is a light source and radiates light (illumination light) to the detection area 121 which is disposed on the top surface of the housing 10. A laser diode may be substituted for the LED 202 as a light source.

The image sensor 201 receives reflective light from the object on the detection area 121, and repeatedly inputs (i.e. repeatedly captures), at regular time intervals, an image which represents the pattern (e.g. fingerprint) of the object. The image sensor 201 compares a currently input latest image and an immediately preceding input image, and calculates movement amounts in the horizontal direction (X) and vertical direction (Y) of the image on the basis of the comparison result. Two-dimensional movement amount information, which is indicative of the calculated movement amounts in the horizontal direction (X) and vertical direction (Y), is sent to the companion IC 123 via, e.g. an interface circuit provided in the optical position detection IC 122.

Figure 4:
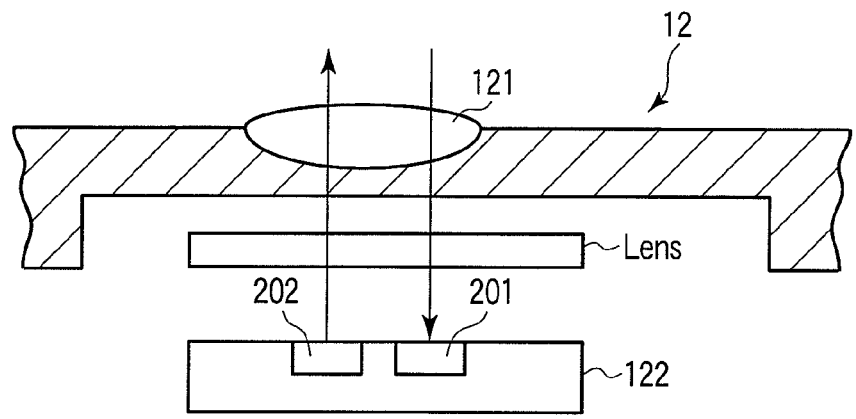
FIG. 4 is an exemplary cross-sectional view showing the structure of an optical pointing device, which is used in the computer according to the embodiment.

FIG. 4 shows an example of the cross-sectional structure of the optical pointing device 12. Light emitted from the LED 202, which is provided in the optical position detection IC 122, is guided to the detection area 121 via, e.g. a lens. Reflective light from the finger placed on the detection area 121 is radiated on the image sensor 201 via, e.g. a convex lens portion for enlarging a pattern such as a projection-and-recess pattern on the inner surface of the finger.

Figures 5A, 5B:
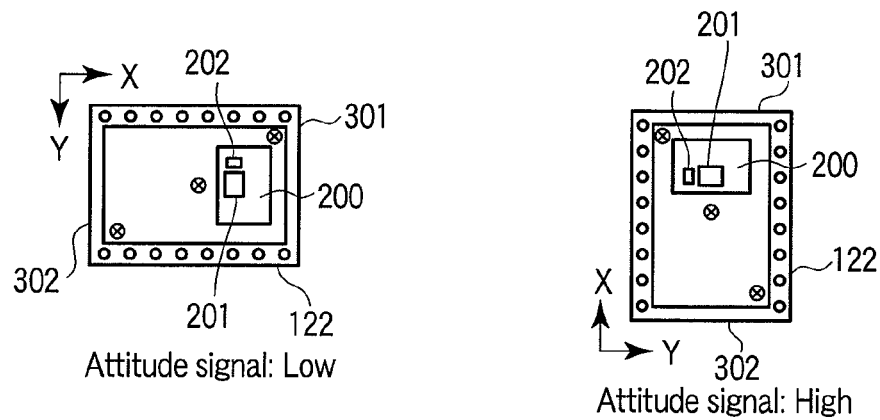
FIGS. 5A, 5B, 5C and 5D are exemplary views for describing examples of the direction of the optical position detection IC, which is used in the computer according to the embodiment.

FIG. 5A to FIG. 5B show examples of the direction of disposition of the optical position detection IC 122.

Four directions shown in FIG. 5A to FIG. 5D are thinkable as the direction in which the optical position detection IC 122 is disposed.

FIG. 5A shows an example in which the optical position detection IC 122 is disposed such that the longitudinal direction thereof is parallel to the front end portion 33 of the housing 10 ("rightward-biased position"). In the case where the optical position detection IC 122 is disposed in the housing 10 in the direction shown in FIG. 5A, one end portion 301 of the optical position detection IC 122 is opposed to the right end portion 31 of the housing 10, and the other end portion 302 of the optical position detection IC 122 is opposed to the left end portion 32 of the housing 10. As has been described above, the sensor unit 200 is disposed at a position which is biased more on the one end portion 301 side than the central position of the package of the optical position detection IC 122. Therefore, by adopting the direction shown in FIG. 5A, the position of the sensor unit 200, that is, the position of the detection area 121, can easily be biased to the right end portion 31 side of the housing 10. Many users operate the optical pointing device 12 by the finger of the right hand (the thumb or index finger of the right hand). Accordingly, the operability of the optical pointing device 12 can be enhanced by disposing the optical position detection IC 122 in the direction shown in FIG. 5A, which makes it possible to easily bias the position of the detection area 121 to the right end portion 31 side of the housing 10.

FIG. 5B shows an example in which the optical position detection IC 122 is disposed such that the longitudinal direction thereof is parallel to the right end portion 31 of the housing 10 ("upward-biased position"). In the case where the optical position detection IC 122 is disposed in the housing 10 in the direction shown in FIG. 5B, one end portion 301 of the optical position detection IC 122 is opposed to the rear end portion 34 of the housing 10, and the other end portion 302 of the optical position detection IC 122 is opposed to the front end portion 33 of the housing 10. In a case where the detection area 121 is disposed on the upper right corner of the top surface of the housing 10, the position of the sensor unit 200, that is, the position of the detection area 121, can easily be biased to the rear end portion 34 side of the housing 10, by adopting the direction shown in FIG. 5B. In addition, in the case where the computer is configured such that a keyboard is disposed on the top surface of the housing 10, the optical position detection IC 122 may be disposed between the keyboard and the front end portion 33 of the housing 10 in the direction shown in FIG. 5B. Thereby, the position of the sensor unit 200, that is, the position of the detection area 121, can be set closer to the keyboard. Therefore, the direction shown in FIG. 5B is also efficient in mounting.

Figures 5C, 5D:
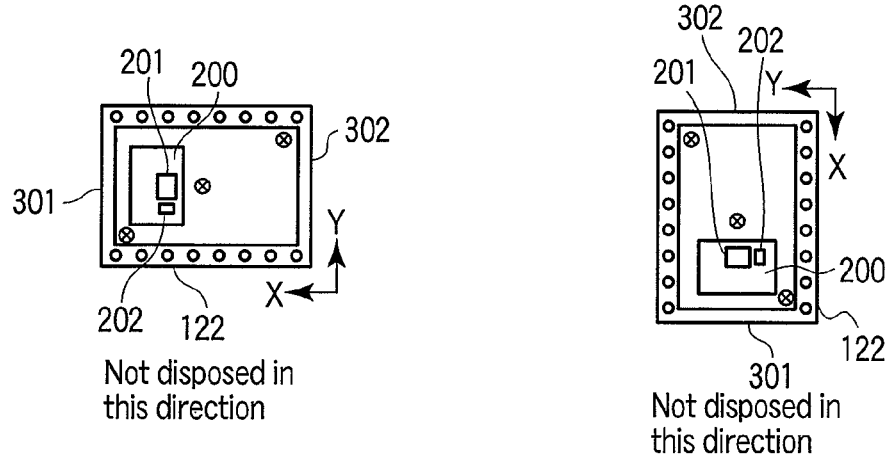

As described above, the rightward-biased position (first direction) shown in FIG. 5A or the upward-biased position (second direction) shown in FIG. 5B is convenient in mounting, as the direction in which the optical position detection IC 122 is disposed. A leftward-biased position shown in FIG. 5C and a downward-biased shown in FIG. 5D are not actually used in most cases.

Accordingly, in the present embodiment, of the four directions (rightward-biased position, upward-biased position, leftward-biased position and downward-biased position), the two directions (rightward-biased position and upward-biased position), in which the efficiency in mounting is high, are set as objects of discrimination, in consideration of the fact that the sensor unit 200 is disposed at a position which is biased more on the one end portion 301 side than the central position of the package of the optical position detection IC 122. The attitude signal output unit in the companion IC 123 outputs an attitude signal which indicates in which of the two directions (rightward-biased position and upward-biased position) the optical position detection IC 122 is disposed.

If all the four directions (rightward-biased position, upward-biased position, leftward-biased position and downward-biased position) are set as objects of discrimination, it becomes necessary to provide two general-purpose IO ports (GPIO) in, e.g. the companion IC 123, thereby to output a 2-bit-width attitude signal. By contrast, in the present embodiment, since only the two directions (rightward-biased position and upward-biased position) are set as objects of discrimination, the number of necessary general-purpose IO ports (GPIO) for outputting an attitude signal is only one.

In addition, since only the two directions (rightward-biased position and upward-biased position) are used as directions in which the optical position detection IC 122 is disposed, the direction of movement of the cursor can also easily be adjusted.

Specifically, the optical position detection IC 122 detects the movement amount in each of the horizontal direction (X) and vertical direction (Y) of the object such as finger. In this case, the actual directions corresponding to the horizontal direction (X) and vertical direction (Y), which are indicated by the movement amount information that is output from the optical position detection IC 122, vary in accordance with the direction of the optical position detection IC 122, as shown in FIG. 5A, FIG. 5B, FIG. 5C and FIG. 5D.

For example, in the rightward-biased position shown in FIG. 5A, the horizontal direction (X) is parallel to the direction of extension of the front end portion 33 and rear end portion 34 of the housing 10, and the vertical direction (Y) is parallel to the direction of extension of the right end portion 31 and left end portion 32 of the housing 10. On the other hand, in the upward-biased position shown in FIG. 5B, the horizontal direction (X) is parallel to the direction of extension of the right end portion 31 and left end portion 32 of the housing 10, and the vertical direction (Y) is parallel to the direction of extension of the front end portion 33 and rear end portion 34 of the housing 10.

In this case, if the optical position detection IC 122 is disposed in the rightward-biased position shown in FIG. 5A, the direction of movement of the finger and the direction of movement of the cursor can be matched without adjusting the movement amount information which is output from the optical position detection IC 122. On the other hand, if the optical position detection IC 122 is disposed in the upward-biased position shown in FIG. 5B, the direction of movement of the finger and the direction of movement of the cursor can be matched by adjusting the movement amount information in such a manner as to rotate the vector of the movement amount information, which is output from the optical position detection IC 122, over 90° in the left direction.

Moreover, the use of the above-described two directions (rightward-biased position and upward-biased position) is also advantageous from the standpoint of reduction in size of the printed circuit board 100.

Figure 6:
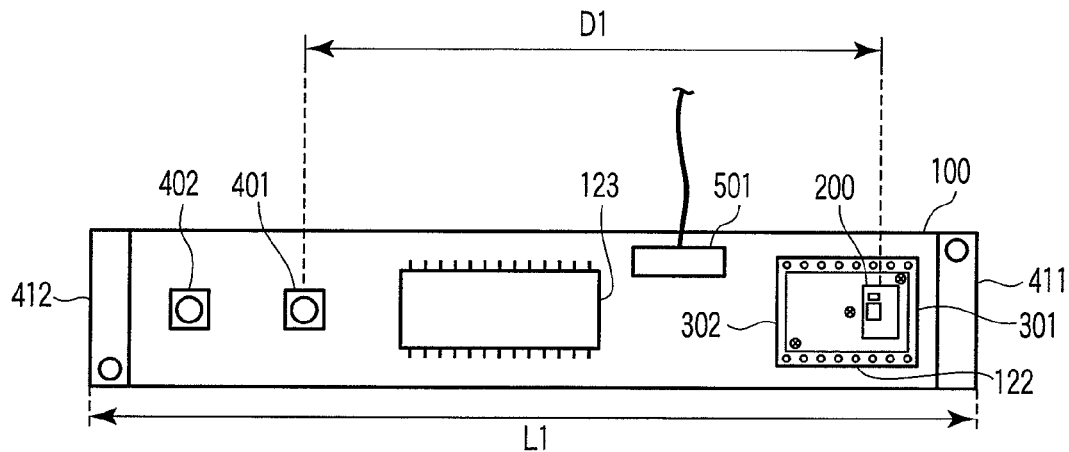
FIG. 6 is an exemplary view showing the structure of a printed circuit board on which the optical position detection IC, which is used in the computer according to the embodiment, is mounted in a first direction.

FIG. 6 shows the structure of the printed circuit board 100 which can support both the above-described two directions (rightward-biased position and upward-biased position).

The optical position detection IC 122, the companion IC 123, a connector 501 and switch detection circuits 401 and 402 are mounted on the printed circuit board 100. The printed circuit board 100 is a rectangular board and has one end portion 411 and the other end portion 412. The length in the longitudinal direction of the printed circuit board 100 is L1.

The optical position detection IC 122 is disposed on the printed circuit board 100 at a position which is biased more on the one end portion 411 side than the central position of the printed circuit board 100, in the state in which one end portion 301 of the optical position detection IC 122 is opposed to the one end portion 411 of the printed circuit board 100 and the other end portion 302 of the optical position detection IC 122 is opposed to the other end portion 412 of the printed circuit board 100.

The switch detection circuit 401 detects ON/OFF of the button switch operation portion for the button switch 13. Since the button switch operation portion for the button switch 13 is disposed at a position on the top surface of the housing 10, which is spaced apart from the detection area 121 by a predetermined distance D1, the switch detection circuit 401 is also mounted on the printed circuit board 100 in the state in which the switch detection circuit 401 is spaced apart from the sensor unit 200 of the optical position detection IC 122 by the predetermined distance D1. In other words, the switch detection circuit 401 is disposed at a position on the printed circuit board 100, which is biased more on the other end portion 412 side than the central position of the printed circuit board 100, so that the switch detection circuit 401 is disposed at the position spaced apart from the sensor unit 200 of the optical position detection IC 122 by the predetermined distance D1.

Figure 7:
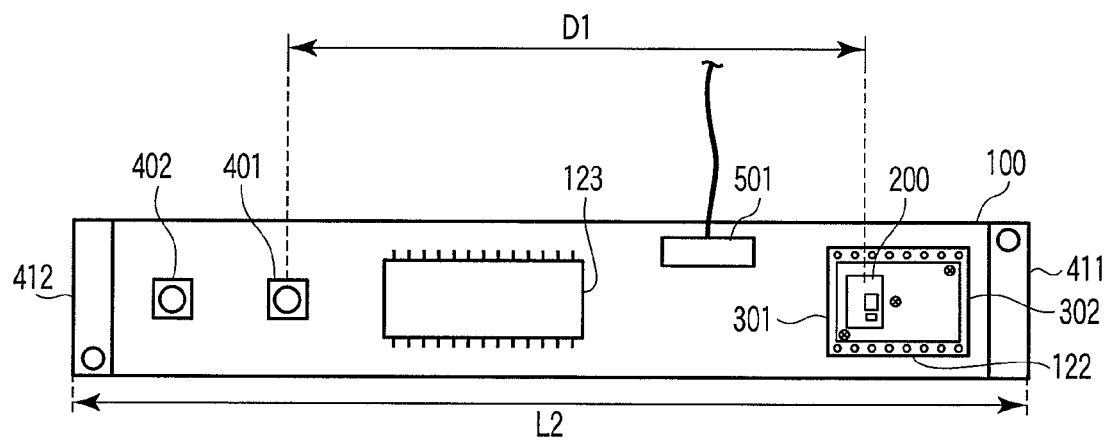
FIG. 7 is an exemplary view showing the state in which the optical position detection IC, which is used in the computer according to the embodiment, is mounted on the printed circuit board in a direction opposite to the first direction.

If the optical position detection IC 122 is mounted on the printed circuit board 100 in a direction as shown in FIG. 7, the length of the printed circuit board 100 increases to L2 (>L1). Specifically, the sensor unit 200 of the optical position detection IC 122 needs to be disposed under the detection area 121, and the switch detection circuit 401 needs to be disposed under the button switch operation portion. Thus, in the structure shown in FIG. 7, too, the sensor unit 200 of the optical position detection IC 122 and the switch detection circuit 401 need to be spaced apart by the distance D1. Since the length between the sensor unit 200 and the other end portion 302 of the optical position detection IC 122 is greater than the length between the sensor unit 200 and the one end portion 301 of the optical position detection IC 122, the adoption of the structure shown in FIG. 7 leads to the need to increase the length of the printed circuit board 100.

Figure 8:
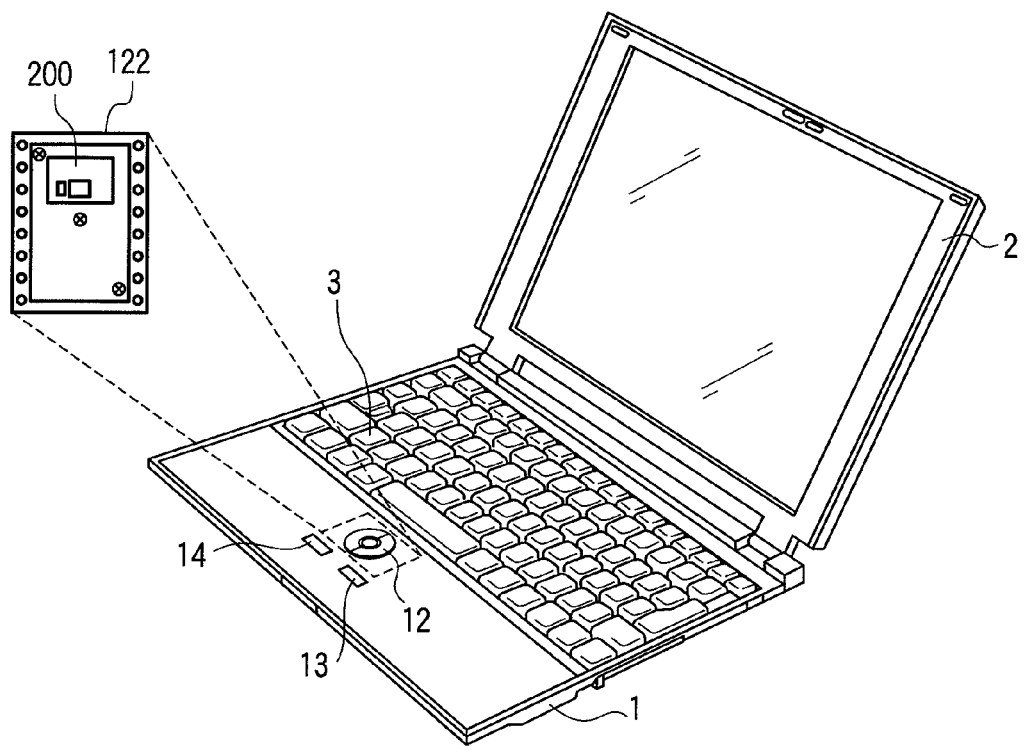
FIG. 8 is an exemplary perspective view showing another example of the external appearance of the computer according to the embodiment.

The computer according to the present embodiment can also be realized by a notebook computer as shown in FIG. 8. This notebook computer comprises a housing 1 and a display unit 2 which is supported on a rear end portion of the housing 1. A keyboard 3 is disposed on the top surface of the housing 1. The optical pointing device 12 disposed on an area of the top surface of the housing 1, which is located between the keyboard 3 and the front end portion of the housing 1. In this case, by disposing the optical position detection IC 122 in the upward-biased position shown in FIG. 5B, the detection area 121 of the optical pointing device 12 can be disposed near the keyboard 3.

Button switches 13 and 14 are disposed on an area of the top surface of the housing 1, which is located between the optical pointing device 12 and the front end portion of the housing 1. The button switches 13 and 14 function as a left button and a right button of a mouse, respectively.

Figure 9:
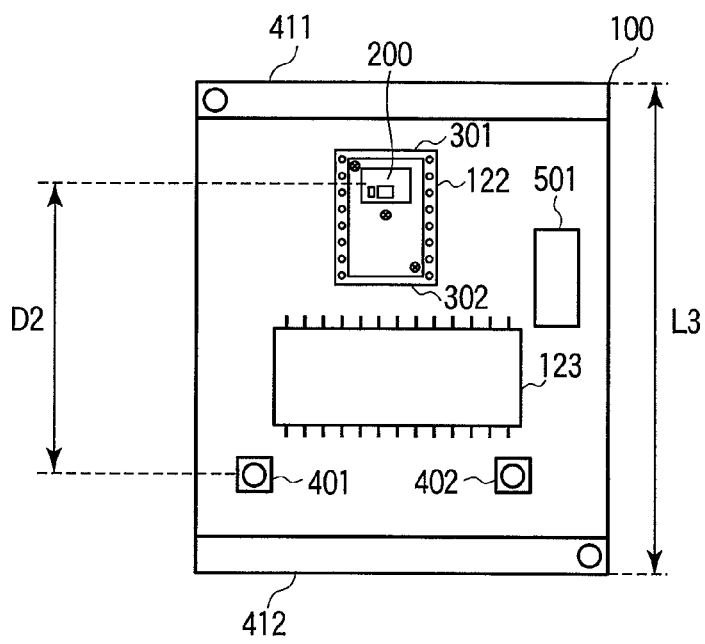
FIG. 9 is an exemplary view showing the structure of a printed circuit board on which the optical position detection IC, which is used in the computer shown in FIG. 8, is mounted in the first direction.

FIG. 9 shows a structure example of the printed circuit board 100 which is applied to the computer shown in FIG. 8.

The optical position detection IC 122, the companion IC 123, a connector 501 and switch detection circuits 401 and 402 are mounted on the printed circuit board 100. The printed circuit board 100 is a rectangular board and has one end portion 411 and the other end portion 412. The length in the longitudinal direction of the printed circuit board 100 is L3.

The optical position detection IC 122 is disposed on the printed circuit board 100 at a position which is biased more on the one end portion 411 side than the central position of the printed circuit board 100, in the state in which the one end portion 301 of the optical position detection IC 122 is opposed to the one end portion 411 of the printed circuit board 100 and the other end portion 302 of the optical position detection IC 122 is opposed to the other end portion 412 of the printed circuit board 100.

Each of the switch detection circuits 401 and 402 is mounted on the printed circuit board 100 in the state in which each of the switch detection circuits 401 and 402 is spaced apart the sensor unit 200 of the optical position detection IC 122 by a predetermined distance D2. In other words, each of the switch detection circuits 401 and 402 is disposed at a position on the printed circuit board 100, which is biased more on the other end portion 412 side than the central position of the printed circuit board 100, so that each of the switch detection circuits 401 and 402 is disposed at the position spaced apart from the sensor unit 200 of the optical position detection IC 122 by the predetermined distance D2.

If the optical position detection IC 122 is mounted on the printed circuit board 100 in a direction as shown in FIG. 10, the length of the printed circuit board 100 increases to L4 (>L3).

FIG. 11 shows the relationship between hardware and software, which is used in the present embodiment. The structures of the hardware and software shown in FIG. 11 are applicable to each of the computer shown in FIG. 1 and the computer shown in FIG. 8.

The optical position detection IC (optical sensor IC) 122 outputs two-dimensional movement amount information in accordance with the movement of the pattern of the object on the detection area 121. The movement amount information is sent to the companion IC 123. The companion IC 123 converts the movement amount information to a predetermined movement amount signal having a signal format such as a PS/2 interface format, and sends the movement amount signal to the EC/KBC 119.

In addition, the companion IC 123 sends to the EC/KBC 119 an attitude signal which indicates whether the optical position detection IC 122 is disposed in the rightward-biased position or the upward-biased position. The keyboard controller (KBC) in the EC/KBC 119 sends the movement amount signal and attitude signal to the CPU 111, for example, by sending an interrupt signal to the CPU 111. During the time period from the power-on of the computer to the completion of the boot of an operating system 603, the control of the display controller 114 is executed by a BIOS 601. The BIOS 601 has a cursor movement direction adjusting function, and controls the movement direction and movement amount of the cursor, which is displayed on the display screen of the display device, on the basis of the attitude signal and the movement amount signal.

Specifically, in the case where the attitude signal indicates a predetermined one of the rightward-biased position and upward-biased position (e.g. rightward-biased position), the BIOS 601 controls the movement amount of the cursor in the horizontal direction (X) and the movement amount of the cursor in the vertical direction (Y) in accordance with the movement amount in the horizontal direction (X) and the movement amount in the vertical direction (Y), which are indicated by the movement amount signal.

On the other hand, in the case where the attitude signal indicates the other of the rightward-biased position and upward-biased position (e.g. upward-biased position), the BIOS 601 controls the movement amount of the cursor in the vertical direction (Y) and the movement amount of the cursor in the horizontal direction (X) in accordance with the movement amount in the horizontal direction (X) and the movement amount in the vertical direction (Y), which are indicated by the movement amount signal. In this case, the BIOS 601 adjusts the movement amount in the horizontal direction (X) and the movement amount in the vertical direction (Y), which are indicated by the movement amount signal, so that the movement amount in the vertical direction (Y), which is indicated by the movement amount signal, may be converted to the movement amount in the horizontal direction (X), and the movement amount in the horizontal direction (X), which is indicated by the movement amount signal, may be converted to the movement amount in the vertical direction (Y) (the movement amount in the -Y direction).

The cursor movement direction adjusting function may also be included in a PS2 driver 602 which handles the movement amount signal, or in the operating system 603. In this case, however, the cursor movement direction adjusting function is not usable until the operating system 603 is booted. By providing the cursor movement direction adjusting function in the BIOS 601, the direction of movement of the user's finger and the direction of movement of the cursor can be matched even in a time period prior to the boot of the operating system 603. Therefore, no matter whether the optical position detection IC 122 in the computer is disposed in the rightward-biased position or the upward-biased position, the user can perform, without unnatural feeling, an operation of, e.g. a BIOS setup screen for prompting the user to designate the operational environment of the computer.

Figure 12:
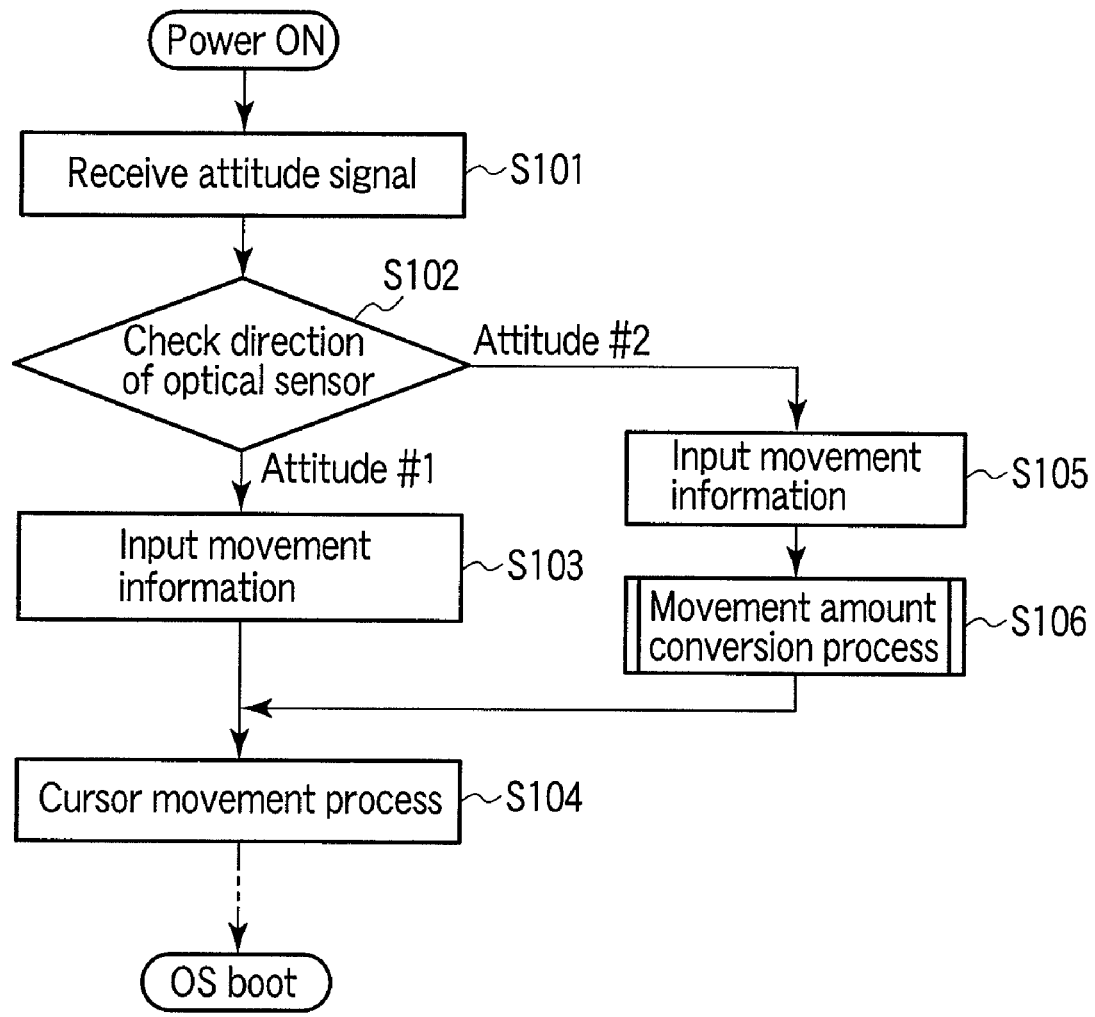
FIG. 12 is an exemplary flow chart illustrating an example of the procedure of a cursor movement direction adjusting process which is executed by the computer according to the embodiment.

Next, referring to a flow chart of FIG. 12, a description is given of the procedure of the cursor movement direction adjusting process which is executed by the BIOS 601.

If the computer is powered on, the CPU 111 executes the BIOS 601. The BIOS 601 receives an attitude signal which is output from the companion IC 123 (step S101), and determines, in accordance with the attitude signal, whether the optical position detection IC (optical sensor IC) 122 is disposed in the rightward-biased position (attitude #1) or the upward-biased position (attitude #2) (step S102).

If the optical position detection IC (optical sensor IC) 122 is disposed in the rightward-biased position (attitude #1), the BIOS 601 receives movement amount information (movement information) which is output from the optical position detection IC 122, and controls the movement amount of the cursor in the horizontal direction and the movement amount of the cursor in the vertical direction in accordance with the movement amount in the horizontal direction and the movement amount in the vertical direction, which are indicated by the movement amount information (step S103, S104).

If the optical position detection IC (optical sensor IC) 122 is disposed in the upward-biased position (attitude #2), the BIOS 601 receives movement amount information (movement information) which is output from the optical position detection IC 122, and executes a movement amount conversion process for converting the movement amount in the horizontal direction and the movement amount in the vertical direction, which are indicated by the movement amount information, to the movement amount in the vertical direction and the movement amount in the horizontal direction (step S105, S106). The BIOS 601 controls the movement amount of the cursor in the horizontal direction and the movement amount of the cursor in the vertical direction in accordance with the movement amount in the horizontal direction and the movement amount in the vertical direction, which are obtained by the movement amount conversion process (step S104).

As has been described above, according to the present embodiment, the movement direction and movement amount of the cursor, which is displayed on the display screen of the display device, are automatically controlled on the basis of the attitude signal which indicates whether the optical position detection IC 122 is disposed in the rightward-biased position or the upward-biased position, and the movement amount signal which is output from the optical position detection IC 122. As described above, by executing the cursor movement direction adjusting process by setting only the two directions, i.e. the rightward-biased position and the upward-biased position, as objects of the process, the degree of freedom of the direction, in which the optical position detection IC 122 is disposed, can be increased with a relatively simple system configuration.

In the present embodiment, the example in which the cursor movement direction adjusting process is executed by the BIOS has been described. Alternatively, it is possible to provide, for instance, a hardware control unit for controlling the movement direction and movement amount of the cursor on the basis of the attitude signal and movement amount information.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
    a rectangular housing with a right end portion, a left end portion, a front end portion and a rear end portion, configured to incorporate a variety of electronic components;
    an optical position detection Integrated Circuit (IC) configured to output two-dimensional movement amount information indicative of amounts of an object movement in a horizontal direction and a vertical direction in accordance with a movement of the object on a detection area comprising a light-transmissive area disposed on a top surface of the housing, the optical position detection IC comprising a rectangular package with a first end portion and a second end portion, and a sensor configured to detect the movement of the object, the sensor being located between the first end portion and a central position of the package, closer to the first end portion side of the package;
    an attitude signal output module in the housing, configured to output a 1-bit-width attitude signal indicative of whether the optical position detection IC is disposed in a first direction in which the first end portion of the package is opposed to the right end portion of the housing and the second end portion of the package is opposed to the left end portion of the housing, or in a second direction in which the first end portion of the package is opposed to the rear end portion of the housing and the second end portion of the package is opposed to the front end portion of the housing; and
    a controller in the housing, configured to control a direction and an amount of movement of a cursor displayed on a display, based on the attitude signal and the movement amount information from the optical position detection IC.

2. The information processing apparatus of claim 1, further comprising:
    a button switch disposed on the top surface of the housing, away from the detection area by a predetermined distance;
    a switch detection circuit in the housing, configured to detect ON and OFF states of the button switch; and
    a printed circuit board with a first end portion and the second end portion in the housing, the optical position detection IC and the switch detection circuit on the printed circuit board,
    wherein the optical position detection IC is disposed at a position located between the first end portion side of the printed circuit board and a central position of the printed circuit board, closer to the first end portion side of the printed circuit board, in a state in which the first end portion of the package is opposed to the first end portion of the printed circuit board,
    the switch detection circuit is disposed at a position located between the second end portion side of the printed circuit board and the central position of the printed circuit board, closer to the second end portion side of the printed circuit board, in such a manner that the switch detection circuit is disposed at a position away from the sensor of the optical position detection IC by the predetermined distance, and
    the printed circuit board is disposed in the housing in either a first layout in which the first end portion of the printed circuit board is opposed to the right end portion of the housing or the second end portion of the printed circuit board is opposed to the left end portion of the housing, and a second layout in which the first end portion of the printed circuit board is opposed to the rear end portion of the housing and the second end portion of the printed circuit board is opposed to the front end portion of the housing.

3. The information processing apparatus of claim 2, wherein the attitude signal output module is mounted on the printed circuit board, and the controller is configured to receive the attitude signal from the attitude signal output module.

4. The information processing apparatus of claim 1, wherein the controller is configured to control the amount of the movement of the cursor in the horizontal direction and the amount of the movement of the cursor in the vertical direction in accordance with the movement amount in the horizontal direction and the movement amount in the vertical direction, respectively, which are indicated by the movement amount information from the optical position detection IC, when the attitude signal indicates either the first direction and the second direction, and the controller is configured to control the amount of the movement of the cursor in the vertical direction and the amount of the movement of the cursor in the horizontal direction in accordance with the movement amount in the horizontal direction and the movement amount in the vertical direction, respectively which are indicated by the movement amount information output from the optical position detection IC, when the attitude signal indicates the other of the first direction and the second direction.

5. An information processing apparatus comprising:

a rectangular housing with a right end portion, a left end portion, a front end portion and a rear end portion, configured to incorporate a variety of electronic components;

an optical position detection IC in the housing, configured to output two-dimensional movement amount information indicative of movement amounts of an object in a horizontal direction and a vertical direction in accordance with movement of the object on a detection area comprising a light-transmissive area which is disposed on a top surface of the housing, the optical position detection IC comprising a rectangular package with a first end portion and a second end portion, and a sensor located between the first end portion side and a central position of the package, closer to the first end portion side of the package, and configured to detect the movement of the object;

a button switch disposed on the top surface of the housing, away from the detection area by a predetermined distance;

a switch detection circuit in the housing, configured to detect ON and OFF states of the button switch;

an attitude signal output module in the housing, configured to output a 1-bit-width attitude signal indicative of whether the optical position detection IC is disposed in a first direction in which the first end portion of the package is opposed to the right end portion of the housing and the second end portion of the package is opposed to the left end portion of the housing, or in a second direction in which the first end portion of the package is opposed to the rear end portion of the housing and the second end portion of the package is opposed to the front end portion of the housing;

a printed circuit board in the housing comprising a first end portion and a second end portion, and on which the optical position detection IC, the switch detection circuit and the attitude signal output module are mounted, the optical position detection IC being disposed between the first end portion side of the printed circuit board and a central position of the printed circuit board closer to the first end portion side of the printed circuit board, in a state in which the first end portion of the package is opposed to the first end portion of the printed circuit board, and the switch detection circuit being disposed between the second end portion side of the printed circuit board and the central position of the printed circuit board closer to the second end portion side of the printed circuit board in such a manner that the switch detection circuit is disposed at a position away from the sensor of the optical position detection IC by the predetermined distance; and a controller in the housing, configured to control a direction and an amount of a movement of a cursor displayed on a display, based on the attitude signal and the movement amount information from the optical position detection IC.

6. The information processing apparatus of claim 5, wherein the controller is configured to control the amount of the movement of the cursor in the horizontal direction and the amount of the movement the cursor in the vertical direction in accordance with the amount of the movement in the horizontal direction and the amount of the movement in the vertical direction, respectively which are indicated by the movement amount information output from the optical position detection IC, when the attitude signal indicates either of the first direction and the second direction, and the controller controls the amount of the movement of the cursor in the vertical direction and the amount of the movement of the cursor in the horizontal direction in accordance with the movement amount in the horizontal direction and the movement amount in the vertical direction, respectively which are indicated by the movement amount information output from the optical position detection IC, when the attitude signal indicates the other of the first direction and the second direction.

* * * * *